US010377436B2

(12) United States Patent
Janyapanich et al.

(10) Patent No.: US 10,377,436 B2
(45) Date of Patent: Aug. 13, 2019

(54) SIDE COVER STRUCTURE FOR MOTORCYCLE

(71) Applicants: HONDA MOTOR CO., LTD., Minato-Ku, Tokyo (JP); Nattapat Janyapanich, Bangkok (TH); Kunakorn Sriwirat, Bangkok (TH); Navapon Plodprong, Bangkok (TH); Natee Aromsuk, Bangkok (TH); Chatriya Kwamchob, Bangkok (TH)

(72) Inventors: Nattapat Janyapanich, Bangkok (TH); Kunakorn Sriwirat, Bangkok (TH); Navapon Plodprong, Bangkok (TH); Natee Aromsuk, Bangkok (TH); Chatriya Kwamchob, Bangkok (TH)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/563,404

(22) PCT Filed: Apr. 3, 2015

(86) PCT No.: PCT/TH2015/000022
§ 371 (c)(1),
(2) Date: Sep. 29, 2017

(87) PCT Pub. No.: WO2016/159894
PCT Pub. Date: Oct. 6, 2016

(65) Prior Publication Data
US 2018/0086406 A1  Mar. 29, 2018

(51) Int. Cl.
*B60N 99/00* (2006.01)
*B62J 17/00* (2006.01)
(Continued)

(52) U.S. Cl.
CPC ............... *B62J 17/00* (2013.01); *B60K 11/06* (2013.01); *B62J 23/00* (2013.01)

(58) Field of Classification Search
CPC ............ B62J 17/00; B62J 23/00; B60K 11/06
See application file for complete search history.

(56) References Cited

U.S. PATENT DOCUMENTS

| 9,878,757 B2 * | 1/2018 | Inomori ................. B62K 11/04 |
| 2014/0084623 A1 | 3/2014 | Miyamoto et al. |
| 2014/0292026 A1 | 10/2014 | Salvaggio, Jr. |

FOREIGN PATENT DOCUMENTS

| CN | 202400216 U | 8/2012 |
| CN | 103029776 A | 4/2013 |

(Continued)

OTHER PUBLICATIONS

PCT/ISA/210 from PCT/TH2015/000022.
(Continued)

*Primary Examiner* — Lori L Lyjak
(74) *Attorney, Agent, or Firm* — Carrier Blackman & Associates, P.C.; Joseph P. Carrier; Jeffrey T. Gedeon

(57) ABSTRACT

A side cover structure for a motorcycle, which is to be arranged for covering a lateral side of the motorcycle, comprising a side cover that covers a lateral side of an air cleaner above the engine and includes a window for allowing vision therethrough. The side cover is provided with a side lower cover, which covers below the side cover and includes a surface portion for attaching from inside of the window of the side cover, and a garnish, which is made attachable/detachable to/from the outside of the window. The surface portion of the side lower cover carries a design shape thereon for being seen when the garnish is taken off from the side cover at the window. Such configuration provides the user to change the appearance of side cover structure of the motorcycle, thereby providing various styles of the side cover structure by the user preference.

12 Claims, 7 Drawing Sheets

(51) Int. Cl.
*B62J 23/00* (2006.01)
*B60K 11/06* (2006.01)

(56) References Cited

FOREIGN PATENT DOCUMENTS

| JP | 10-086871 A | | 4/1998 | |
|---|---|---|---|---|
| JP | H10-273083 A | | 10/1998 | |
| JP | 2006-082727 A | | 3/2006 | |
| JP | 2010120625 A | * | 6/2010 | ........... B60R 25/102 |
| JP | 2011-183954 A | | 9/2011 | |
| JP | 2014-061819 A | | 4/2014 | |

OTHER PUBLICATIONS

Office Action issued in the corresponding Japanese Patent Application 2017-552016 with the English translation thereof, dated Jul. 24, 2018.

Office Action dated Feb. 27, 2019, issued in the corresponding Chinese Patent Application 201580078498.6 with the English translation thereof.

* cited by examiner

SIDE COVER STRUCTURE FOR MOTORCYCLE

FIELD OF THE INVENTION

The present invention relates to a side cover structure for use on a motorcycle.

BACKGROUND OF THE INVENTION

Japanese Patent Publication No. 10-86871 disclosed an inside-outside double wall structure 76 comprising an inside cover 76a covered with a smaller outside cover 76b. With such structure in which the outside cover 76b is painted with a cheap paint and made attachable/detachable to the inside cover 76a using mounting holes and engaging projections, the design can only be changed when the colors of the paint on the outside covers are changed. Thus, this restricts the degree of freedom on the user being able to vary the external appearance of the motorcycle.

Therefore, it is an objective of the present invention to provide a side cover structure which allows for changing and providing for various styles of side cover structure by the user preference.

SUMMARY OF THE INVENTION

The present invention has been achieved to provide a side cover structure for use on a motorcycle which is capable to allow the user to change the external appearance and provide various styles of the motorcycle's side cover structure.

An embodiment of the present invention produces the side cover structure for a motorcycle, which is to be arranged for covering on a lateral side of the motorcycle at a position between a fuel tank and an engine, comprising a side cover, which includes a window for allowing vision therethrough, a side lower cover, which covers below said side cover, wherein said side lower cover includes a surface portion for attaching from inside of said window of said side cover, and a garnish, which is made attachable/detachable to/from the outside of said window, wherein said surface portion of said side lower cover carries a design shape thereon for being seen when said garnish is taken off from said side cover at said window.

It enables for the design shape to be seen when the garnish is taken off from the side cover, allowing the user to change the appearance of side cover structure of the motorcycle, thereby providing various styles of the side cover structure by the user preference.

In the side cover structure of the embodiment of the present invention, the side cover structure further comprises an air cleaner that is provided above said engine, wherein said side cover covers a lateral side of said air cleaner. According to this design, the side cover structure comprises a three layer structure of the side cover, the side lower cover and the garnish that covers both lateral sides of the air cleaner, it provides an effective prevention for the noise of intake air sucked into the air cleaner's case.

In the side cover structure of the embodiment of the present invention, said surface portion includes a mounting boss and a mounting snap fit for mounting said garnish to said surface portion. According to this design, it does not require use of many mounting bolts or screw, thereby providing a better appearance of side cover structure and also enables easy installation for the garnish as well.

In the side cover structure of the embodiment of the present invention, said garnish includes a male snap-fit element and said surface portion includes a female snap-fit element for engaging with said male snap-fit element of said garnish.

By locating the male snap fit element on the garnish instead of the surface portion, it provides better appearance of side cover structure when the garnish is taken off because there is no male snap fit element appeared outside.

In the side cover structure of the embodiment of the present invention, the side cover structure further comprising a side rear cover which is positioned corresponding to a rear portion of said side cover for covering a lateral side below a seat of the motorcycle, and further comprising a window nearby said seat, and said side lower cover is facing from inside of said window of said side rear cover, wherein a seat key cylinder is faced from the inside of said side lower cover and accommodated within said window and for locking and unlocking said seat. According to this arrangement, since the side rear cover and the side lower cover form a layer structure around the seat key cylinder and the side lower cover has a long surface in the front-rear direction with a hard stiffness, it provides a safe protection for the seat key cylinder.

In the side cover structure of the embodiment of the present invention, said garnish has a polygon shape, and said mounting boss and said mounting snap fit are positioned near vertex or corner of said polygon shape, wherein said design shape is positioned in the space therebetween.

According to this design, since the mounting boss and the mounting snap fit are formed near the corner of the polygon-shaped garnish, it provides a wide space for the design shape, thereby allowing a clear vision to the design shape from the side view when the garnish is taken off.

In the side cover structure of the embodiment of the present invention, said design shape is an "X" or cross shape, and is protruded on the surface of said surface portion and positioned overlapping said air cleaner when seeing from side view. According to this design and arrangement, since the protruded "X" or cross shape provides an appearance that the user can feel this surface structure is more stiffness than the garnish is attached as well as the protrusion of the design shape provides a prevention for the noise of intake air sucked into said air cleaner's case.

In the side cover structure of the embodiment of the present invention, the garnish includes an air outlet shape positioning at a rear portion of said garnish through which passing hot air from said engine system, wherein said mounting snap fit is positioned rearward to said air outlet shape.

According to this arrangement, since the mounting snap fit is formed on the inside surface of the garnish, it causes the air outlet shape can be formed on the outside surface of the garnish, it provides an appearance that the user can feel the motorcycle to look like a sport bike.

In the side cover structure of the embodiment of the present invention, the side cover structure further comprises a side upper cover which is positioned corresponding to an upper portion of said side cover and an upper portion of said side rear cover such that said side upper cover covers a lateral side of said fuel tank.

According to this design, since the side cover structure includes many cover structure, it allows the user to customize or change the appearance of side cover structure of the motorcycle, thereby providing various styles of the side cover structure by the user preference.

BRIEF DESCRIPTION OF DRAWINGS

The present invention will become more fully understood from the detailed description given hereinbelow and the accompanying drawings which are given by way of illustration only, and thus are not limitative of the present invention, and wherein.

DETAILED DESCRIPTION OF EMBODIMENTS OF THE INVENTION

Hereinafter, the embodiment of the present invention will be explained with reference to the drawings.

FIGS. 1-8 show the embodiment of the side cover structure 15, according to the principle of the present invention.

Figure 1:
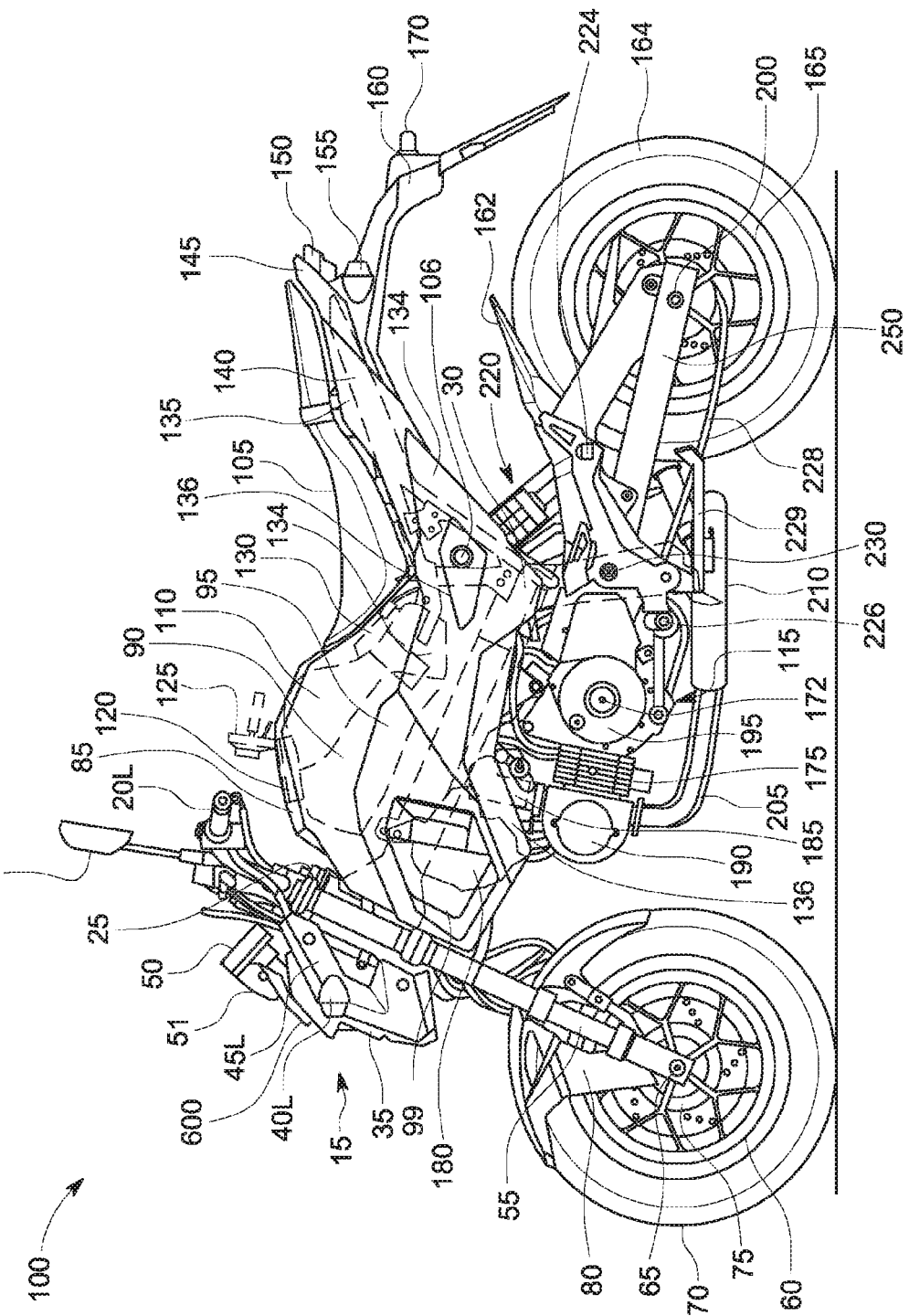
FIG. 1 shows a left side view of a motorcycle comprising an embodiment of a side cover structure according to the principle of the present invention.
Figure 2:
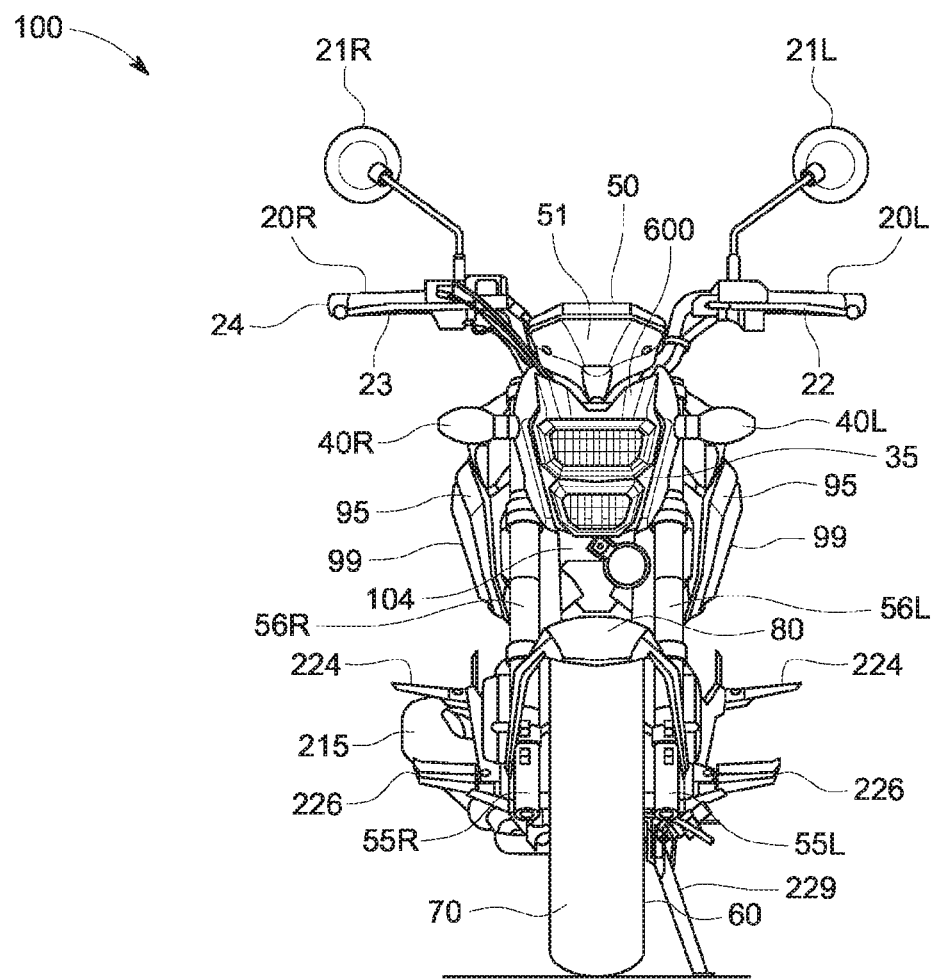
FIG. 2 shows a front view of a motorcycle comprising an embodiment of a side cover structure according to the principle of the present invention.
Figure 3A:
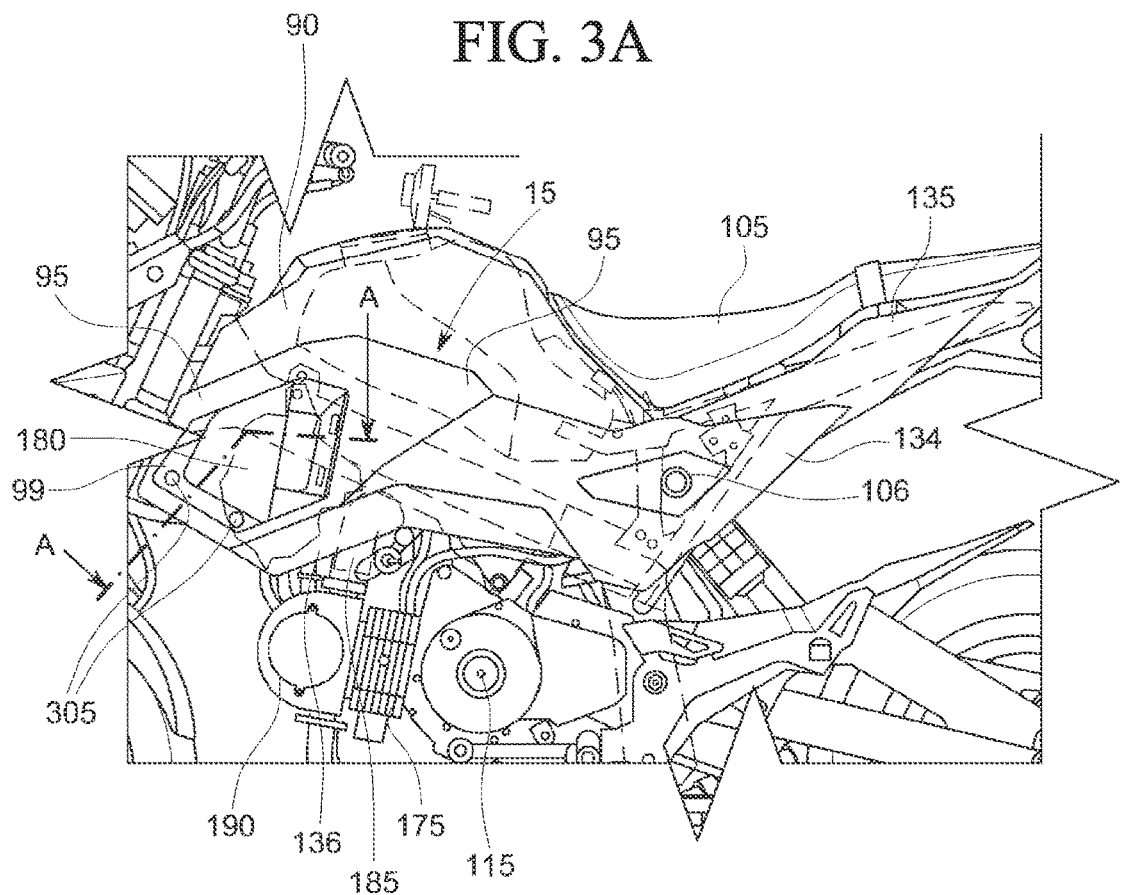
FIG. 3a shows a left side view of an embodiment of a side cover structure according to the principle of the present invention.
Figure 3B:
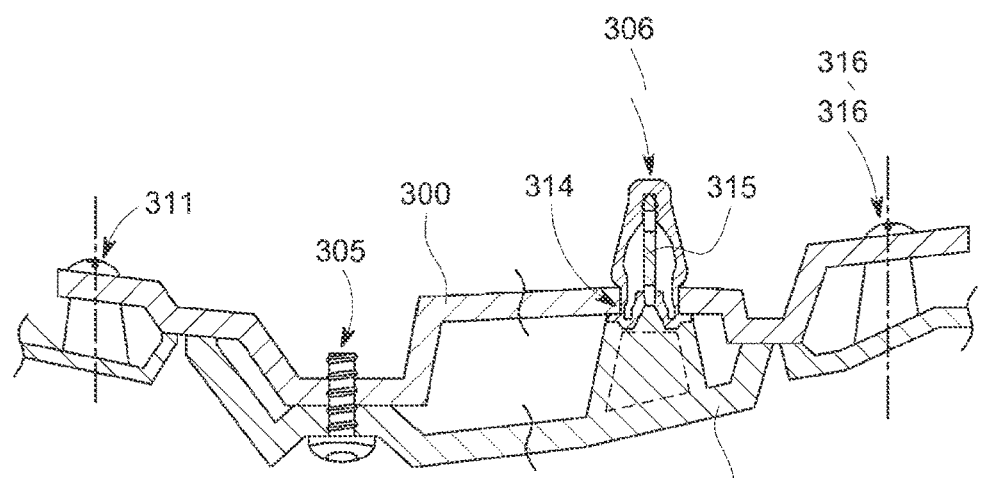
FIG. 3b shows a left A-A sectional view of an embodiment of a side cover structure according to the principle of the present invention.
Figure 4A:
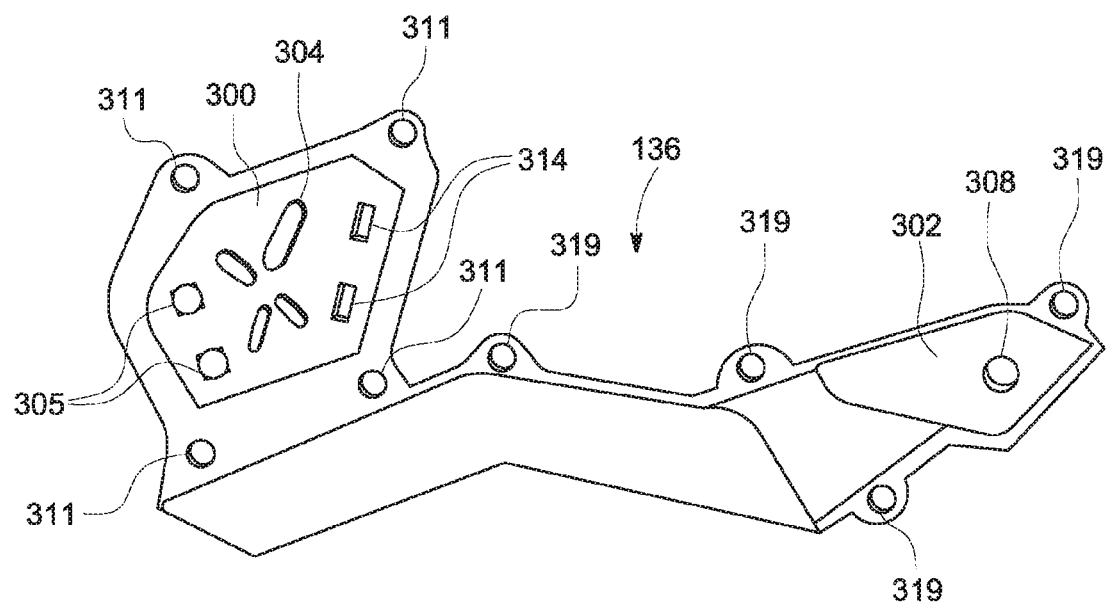
FIG. 4a shows a left side view of a side lower cover of a side cover structure according to the principle of the present invention.
Figure 4B:
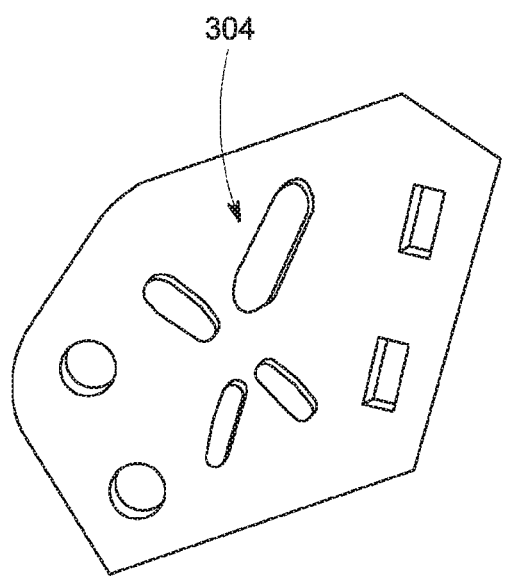
FIG. 4b shows a zoomed-up view of a surface portion including a design shape and plurality of mounting bosses and snap fits of a side lower cover of a side cover structure according to the principle of the present invention.
Figure 5:
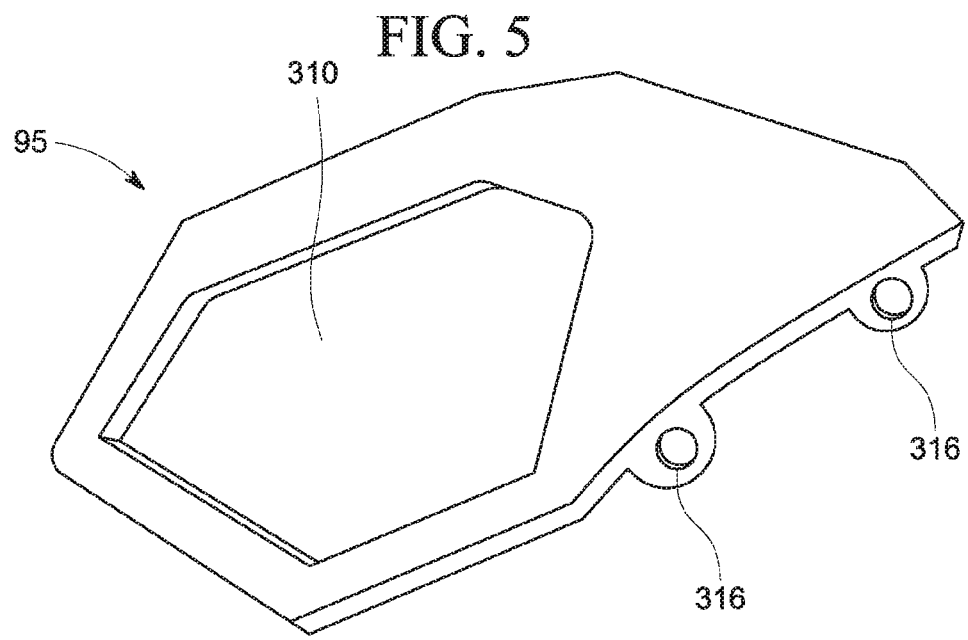
FIG. 5 shows a left side view of a side cover of a side cover structure according to the principle of the present invention.
Figure 6:
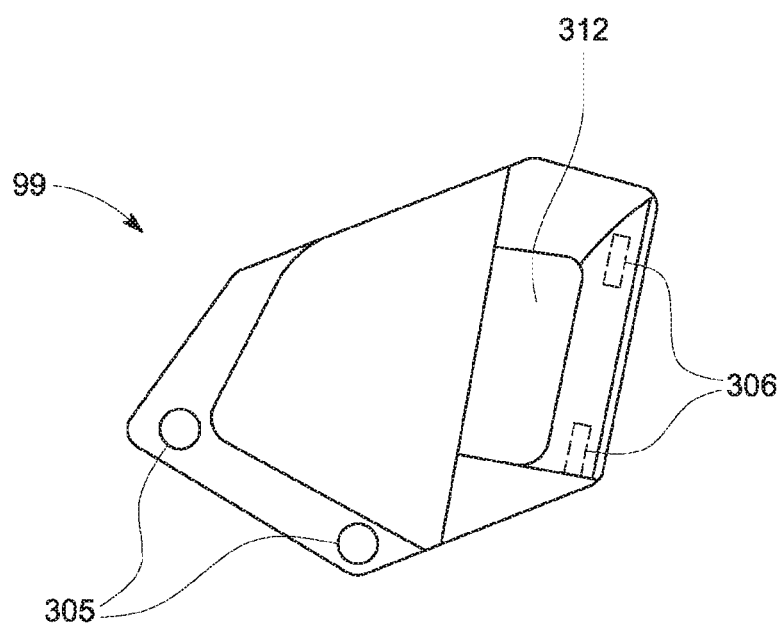
FIG. 6 shows a left side view of a garnish of a side cover structure according to the principle of the present invention.
Figure 7:
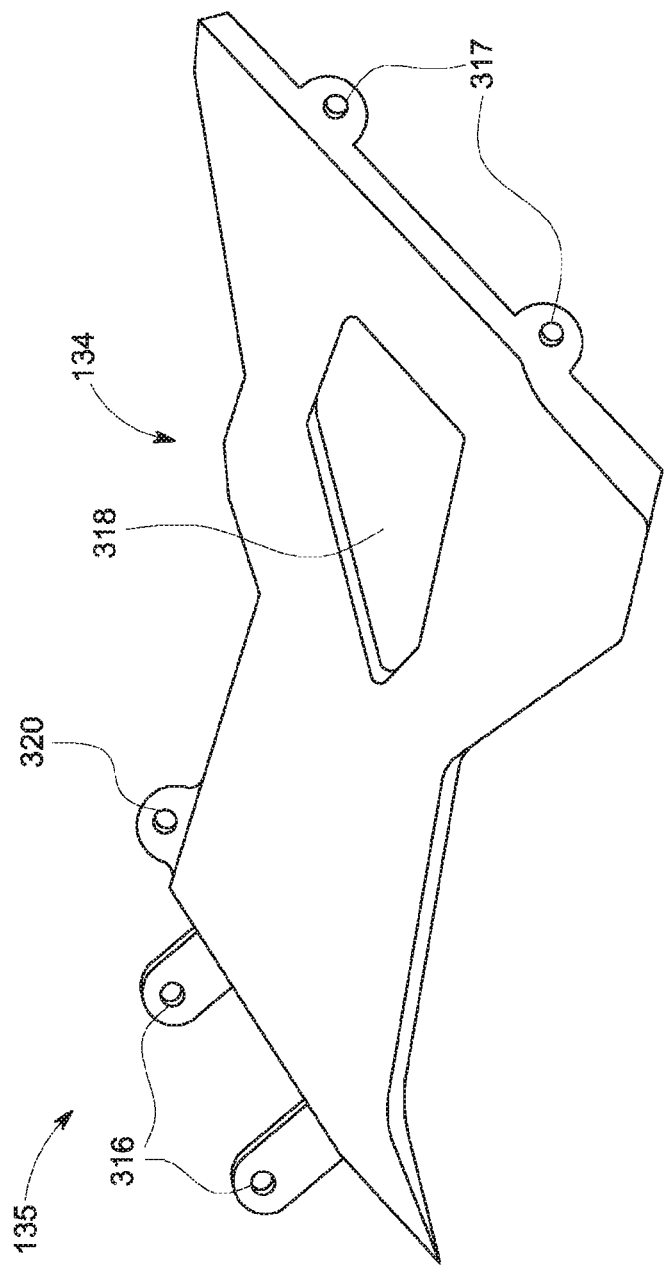
FIG. 7 shows a left side view of a side rear cover of a side cover structure according to the principle of the present invention.
Figure 8:
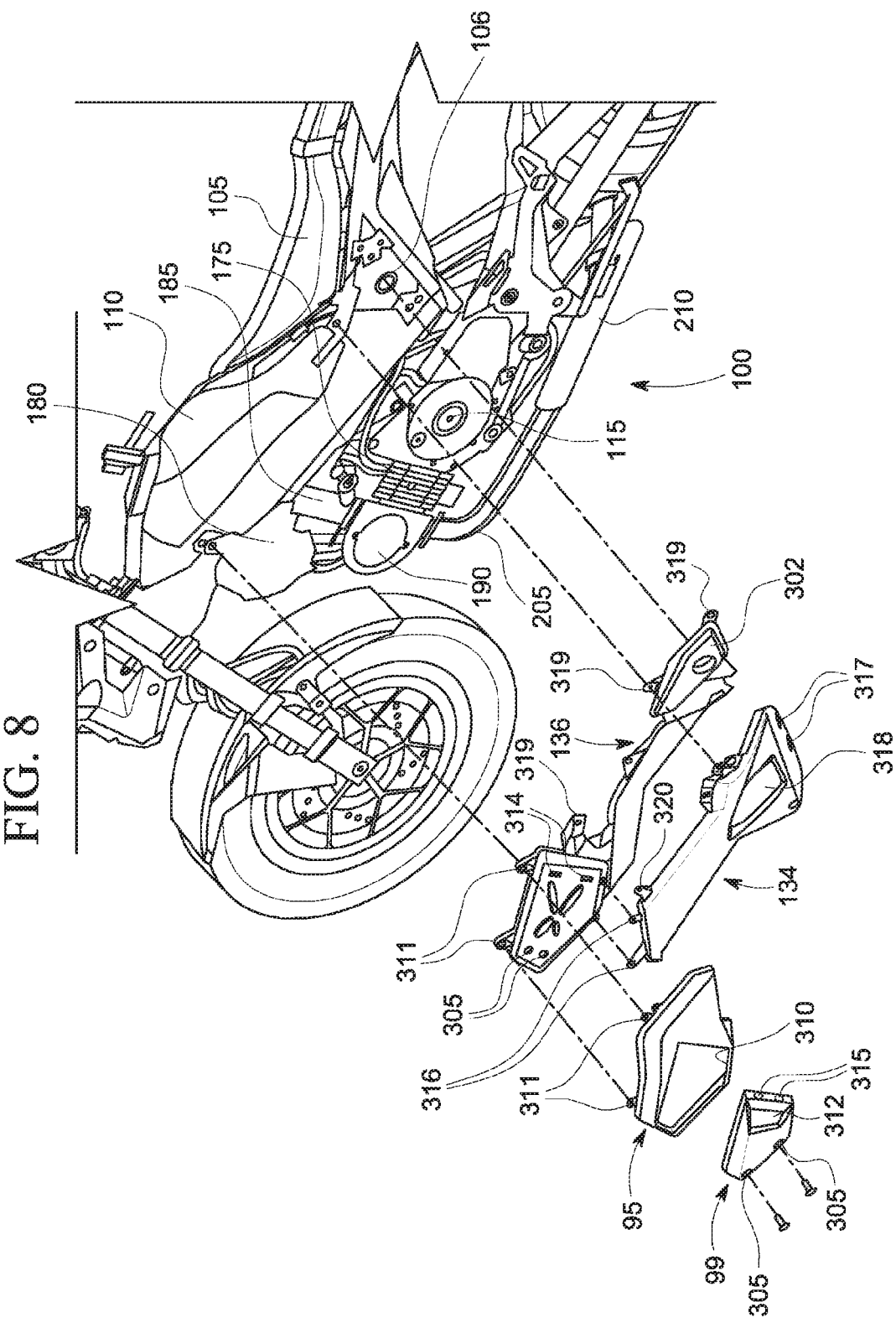
FIG. 8 shows an exploded view of a side cover structure according to the principle of the present invention.

In more detail, FIGS. 1-2 show a left side view and a front view, respectively, of a motorcycle 100 comprising an embodiment of a side cover structure 15 according to the principle of the present invention. In this exemplary example, the side cover structure 15 is assembled to a lateral side of the motorcycle 100.

The motorcycle 100 constitutes a pair of handle grips 20L,R steerably connecting to a pair of front forks 55L,R mounted on a body frame 30 extending in a rearward direction of a motorcycle body. Adjacent to the pair of handle grips 20L,R, a pair of rear view mirrors 21L,R is mounted. Also at the front of the left handle grip 20L, a clutch lever 22 is designed, whereas at the front of the right handle grip 20R, a rear brake lever 23 is designed and a throttle 24 is coupled on the right handle grip 20R.

A headlight 35 is covered with a head light cover 600 and a pair of headlight side covers 45L,R where a pair of winker lights 40L,R is mounted to, and mounted to a front section of the motorcycle 100 below a meter 50 having a meter cover 51 affixed thereto.

The body frame 30 supports the pair of front forks 55L,R to enable steer a front wheel 60 at a front axle 65; the front wheel 60 is equipped with a front tire 70 and a disk brake rotor 75 at right side of the front tire 70 to allow controlling rotation of the front wheel 60. The front wheel 60 is small size same as a rear wheel 165, 10-12 inches which means small motorcycle; a front fender 80 designed to block dirt or debris picking up by the rotation of the front wheel 60 is positioned above the front wheel 60 and between the pair of the front forks 55L,R. The body frame 30 supports a fuel tank 110 which stores and supplies fuel to an engine system 115 hanged at a lower portion of the mid-section of the body frame 30; the fuel tank 110, which is located toward the front of the vehicle between the headlight 35 and a seat 105 of which supported on a seat frame 140, includes a fuel receiving inlet 120 for receiving fuel, a fuel lid 125, and a fuel pump 130 installed into the fuel tank 110.

The motorcycle 100 is covered by a combination of body covers that provide cover for the internal structures and elements of the motorcycle 100, including a center cover 85 that covers upper portions of the fuel tank 110 and the fuel inlet 120, a pair of side upper covers 90, a pair of side covers 95 of which may optionally include a pair of garnishes 99, a pair of side lower covers 136, a pair of side rear covers 134 and a pair of side rear upper covers 135. A seat key cylinder 106 is installed on the left side lower cover 136 surrounded by the left side rear cover 134 as to provide access to an underside of the seat 105.

Continuous with the seat frame 140 are a rear grip 145 of which provides grips for a passenger, a tail light 150 and a pair of rear winker lights 155, a rear fender 160 suspended above a rear tire 164 and a license light 170 disposed on the rear fender 160. The rear fender 160 is designed to block dirt and debris picking up by the rear wheel 165 from traveling further or spray onto the rider or the passenger. Inner rear fender portion 162 will also supplementary provide the same affects.

The engine system 115 being 4-stroke type and under 200-cc capacity as small engine includes a cylinder bloc 175 connecting to a cylinder head 190 which is connected to an engine intake system with an air cleaner 180 which supplies filtered air to a throttle body 185 which includes an injector and throttle valves, a crank case 195 supports the cylinder bloc 175 in manner for inclining the axis of the cylinder bloc 175 forwardly, similar to the horizontal. This horizontal engine layout is so suitable for small motorcycle because of small wheel size. The engine system 115 generates drive force which is delivered to the rear wheel 165 by a drive chain 228. Exhaust from the cylinder head 190 is directed to an exhaust system into an exhaust pipe 205 leading to an exhaust chamber 210 and subsequently to a muffler 215 directing toward the rear of the motorcycle 100.

As generally known in the art, the suspension components of a motorcycle 100 comprise of the front forks 55L, R on the front of the motorcycle 100 and a rear cushion unit 220 on the rear of the motorcycle 100 to absorb road conditions and provides a comfortable ride. The swing arm 250 on the rear of the motorcycle 100 is functioned as a base for mounting of a rear axle 200 and assembly of the rear wheel 165, having the rear tire 164 assembled thereto, at the rear axle 200. The rear wheel 165 is pulled by the chain 228. A pair of a passenger steps 224 and a pair of rider steps 226 are also provided for comfort of the rider and the passenger respectively are disposed behind the engine system 115. A side stand 229 is provided on the left side of the motorcycle 100 to support the motorcycle 100 when parked.

Now, turning to the side cover structure 15 according to the present invention, in more detail as shown in FIGS. 3-8, the side cover structure 15, according to this embodiment comprising a side cover 95, a garnish 99 and a side lower cover 136 forming the side cover structure 15 of the motorcycle 100. In FIG. 4a, a pair of side lower cover 136L,R positions at the lateral side of the motorcycle 100 to cover the air cleaner 180, the throttle body 185 and the upper portion of the motorcycle 100 above the engine system 115 in respectively from its front to rear structure. In particularly, at front of the side lower cover 136 is a surface portion 300 that is polygon shape and covers around the air cleaner 180. The surface portion 300 is protruded with a design shape 304 which is a "X" or cross shape, and is provided with a plurality of mounting boss 305 and a plurality of mounting snap fit 306 positioned surrounding the design shape 304. "X" or cross shape of the design shape 304 begins its structure from the vertex or corner of the surface portion 300 and ends at almost the center portion of the surface portion 300. According to the surface portion 300 is covering around side portion of the air cleaner 180, sometimes the vibration is occurred around therein when the air cleaner 180 is working, the protruded "X" or cross shape at the surface portion 300 can reduce the noise of such vibration. Correspondingly, a mounting boss element 305 and a female mounting snap fit element or hole 314 of the mounting snap fits 306 are positioned at vertex or corners of the surface portion 300 for connecting with the garnish 99 by bolts or screws at the mounting bosses 305 and male snap fit elements 315 attaching the mounting snap fits 306 from both sides direction of the motorcycle 100. The rear portion 302 that is rearward extended from the surface portion 300 is arranged to face the seat key cylinder 106 and is formed with a through hole portion 308 configured to fit in with the seat key cylinder 106 that provides locking and unlocking for opening the seat 105 which provides the storage inside. The side cover 95 provides cover for the uncovered portion of the lateral side of the air cleaner 180 and includes a window 310 for allowing vision therethrough. In more detail, the window 310 of the side cover 95 is surrounding and windowing the design shape 304 of the surface portion 300, the side cover 95 is mounted to the side lower cover 136 from the interior of the side cover 95 by means of mounting portions 311. A pair of garnishes 99L,R is a detachable cover that attaches to the window 310 of the side cover 95 for covering the design shape 304 of the surface portion 304, and forms an air outlet shape 312 like as the air outlet hole of the motorcycle 100 at a rear portion of the garnish 99 for seeming the hot air from the engine system 115 to pass therethrough, similarly to the high power motorcycle. As the above description, the garnish 99 is provided with a male snap-fit element 315 at inner surface that contacts with the surface portion 300 of the side lower cover 136 and rearward position more than the air outlet shape 312. As a result, the female snap-fit element 314 and the male snap-fit element 315 form the mounting snap fit 306 and the mounting bosses 305 by way of bolts or screws provides for allowing the garnish 99 to attach/detach to/from the window 310 from outside of the window 310, thereby allowing/obstructing vision to the design shape 304.

To complete the installation, the side cover structure 15 according to the present invention also comprises a side rear cover 134 and a side upper cover 90. The side rear cover 134 is arranged in the position corresponding to the side lower cover 136 and a rear portion of the side cover 95, and is extended rearward to provide cover for the space below and above the engine system 115 in lateral side of the motorcycle 100. The side rear cover 134 includes a window 318 which is positioned and configured to fit in with the rear portion 302 of the side lower cover 136. By positioning the window 318 to attach with the rear portion 302, wherein the side rear cover 134 appears to surround the rear portion 302 of the side lower cover 136, and the side rear cover 134 further covers the mounting portion of the rear cushion 220 and the body frame 30. The side rear cover 134 is mounted to the side cover 95 and the side lower cover 136 from the interior of the side cover 95 and the side rear cover 134 by means of a mounting portion 316 and a plurality of a mounting portion 319, respectively. Furthermore, the side rear upper cover 135 is provided and configured to the upper rear portion of the side rear cover 134 and covers the rear portion of the motorcycle 100 below the seat 105 and the seat frame 140. The side upper cover 90 is arranged positioned corresponding to an upper portion of the side cover 95 and mounted to a front upper portion of the side rear cover 134 by the mounting portion 320 as to provide cover for a lateral side of the fuel tank 110 including the fuel pump 130.

As it is apparent from the above teaching, by providing alternative side cover structure according to the principle of the present invention, it is possible to change the external appearance of the motorcycle according to the preference of the user as set out in the objective of the invention described above.

Although specific embodiments of the invention have been disclosed and described as well as illustrated in the companying drawings, it is simply for the purpose of better understanding of the principle of the present invention and it is not as a limitation of the scope and spirit of the teaching of the present invention. Adaption and modification to various structure such as mounting mechanism of various parts and elements or embodiments are possible and apparent to a skilled person without departing from the scope of the present invention which is to be determined by the claims.

LIST OF REFERENCE 15 side cover structure
20L,R a pair of handle grips
21L,R a pair of rear-view mirrors
22 clutch lever
23 rear brake lever
24 throttle
25 head pipe
30 body frame (main frame)
35 head light
40L,R a pair of front-winker lights
45L left headlight side-cover
45L,R a pair of headlight side-cover
50 meter
51 meter cover
55L,R a pair of front forks
60 front wheel
65 front axle
70 front tire
75 front disc brake
80 front fender
85 center cover
90 side upper cover
95 side cover
99 garnish
100 motorcycle
105 seat
106 seat key cylinder
110 fuel tank
115 engine system
120 fuel inlet
125 fuel lid
130 fuel pump
134 side rear cover
135 side rear upper cover
136 side lower cover 140 seat frame
145 rear grip
150 tail light
155L,R a pair of rear winker lights
160 rear fender
162 inner rear fender
164 rear tire
165 rear wheel
170 license light
175 cylinder bloc
180 air cleaner
185 throttle body
190 cylinder head
195 crank case
200 rear axle
205 exhaust pipe
210 exhaust chamber
215 muffler
220 rear cushion unit
224L,R a pair of passenger steps
226L,R a pair of rider steps
228 chain
229 side stand
250 swing arm
300 surface portion (on the side lower cover)
302 rear portion (on the side lower cover)
304 design shape
305 mounting boss
306 mounting snap fit
308 hole portion (on the rear portion of the side lower cover)
310 window (on the side cover)
311 mounting portions (on the side cover)
312 air outlet shape (on the garnish)
314 female snap-fit element (on the surface portion of the side lower cover)
315 male snap-fit element (on the garnish)
316 mounting portions (on the side cover and the side rear cover)
317 mounting portions (on the side lower cover and the side rear cover)
318 window (on the side rear cover)
319 mounting portion (on the side lower cover and the side rear cover)
320 mounting portion (on the side upper cover and the side rear cover)

The invention claimed is:

1. A side cover structure for a motorcycle, which is to be arranged for covering a lateral side of the motorcycle at a position between a fuel tank and an engine, comprising:
    a side cover, which includes a window for allowing vision therethrough,
    a side lower cover, which covers below said side cover, wherein said side lower cover includes a surface portion for attaching from inside of said window of said side cover, and
    a garnish, which is made attachable/detachable to/from the outside of said window,
    wherein said surface portion of said side lower cover carries a design shape thereon for being seen when said garnish is taken off from said side cover at said window.

2. The side cover structure according to claim 1, further comprising an air cleaner that is provided above said engine, wherein said side cover covers a lateral side of said air cleaner.

3. The side cover structure according to claim 1, wherein said surface portion includes a mounting boss and a mounting snap fit for mounting said garnish to said surface portion.

4. The side cover structure according to claim 3, wherein said garnish includes a male snap-fit element and said surface portion includes a female snap-fit element for engaging with said male snap-fit element of said garnish.

5. The side cover structure according to claim 1, further comprising a side rear cover which is positioned corresponding to a rear portion of said side cover for covering a lateral side below a seat of the motorcycle, and further comprising a window nearby said seat, and said side lower cover is facing from inside of said window of said side rear cover,
    wherein a seat key cylinder is faced from the inside of said side lower cover and accommodated within said window and for locking and unlocking said seat.

6. The side cover structure according to claim 3, wherein said garnish has a polygon shape, and said mounting boss and said mounting snap fit are positioned near vertex or corner of said polygon shape, wherein said design shape is positioned in the space therebetween.

7. The side cover structure according to claim 1, wherein said design shape is an "X" or cross shape, and is protruded on the surface of said surface portion and positioned overlapping said air cleaner when seeing from side view.

8. The side cover structure according to claim 6, wherein the garnish includes an air outlet shape positioning at a rear portion of said garnish through which passing hot air from said engine system, wherein said mounting snap fit is positioned rearward to said air outlet shape.

9. The side cover structure according to claim 5, further comprising a side upper cover which is positioned corresponding to an upper portion of said side cover and an upper portion of said side rear cover such that said side upper cover covers a lateral side of said fuel tank.

10. The side cover structure according to claim 2, wherein said surface portion includes a mounting boss and a mounting snap fit for mounting said garnish to said surface portion.

11. The side cover structure according to claim 2 further comprising a side rear cover which is positioned corresponding to a rear portion of said side cover for covering a lateral side below a seat of the motorcycle, and further comprising a window nearby said seat, and said side lower cover is facing from inside of said window of said side rear cover,
    wherein a seat key cylinder is faced from the inside of said side lower cover and accommodated within said window and for locking and unlocking said seat.

12. The side cover structure according to claim 2, wherein said design shape is an "X" or cross shape, and is protruded on the surface of said surface portion and positioned overlapping said air cleaner when seeing from side view.

* * * * *

UNITED STATES PATENT AND TRADEMARK OFFICE
CERTIFICATE OF CORRECTION

PATENT NO. : 10,377,436 B2  
APPLICATION NO. : 15/563404  
DATED : August 13, 2019  
INVENTOR(S) : Janyapanich et al.

Page 1 of 1

It is certified that error appears in the above-identified patent and that said Letters Patent is hereby corrected as shown below:

On the Title Page

Item (71) Change:
"HONDA MOTOR CO., LTD.
Minato-ku, Tokyo (JP), Nattapat Janyapanich, Bangkok (TH);
Kunakorn Sriwirat, Bangkok (TH);
Navapon Plodprong, Bangkok (TH);
Natee Aromsuk, Bangkok (TH);
Chatriya Kwamchob, Bangkok (TH)"

To:
-- HONDA MOTOR CO.. LTD.
Minato-ku, Tokyo (JP) --

Signed and Sealed this
Twenty-sixth Day of November, 2019

Andrei Iancu
*Director of the United States Patent and Trademark Office*